United States Patent
Subramanian

(10) Patent No.: US 11,904,831 B2
(45) Date of Patent: Feb. 20, 2024

(54) METHOD AND SYSTEM FOR MODIFYING CHASSIS CONTROL PARAMETERS BASED ON TIRE INFORMATION

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 17/807,355

(22) Filed: Jun. 16, 2022

(65) Prior Publication Data
US 2022/0402474 A1 Dec. 22, 2022

(30) Foreign Application Priority Data
Jun. 17, 2021 (EP) .................................. 21180091

(51) Int. Cl.
*B60W 10/00* (2006.01)
*B60W 10/119* (2012.01)
(Continued)

(52) U.S. Cl.
CPC .......... *B60W 10/119* (2013.01); *B60W 10/18* (2013.01); *B60W 10/22* (2013.01);
(Continued)

(58) Field of Classification Search
CPC .... B60W 10/119; B60W 10/18; B60W 10/22; B60W 50/00; B60W 50/14; B60W 2050/0028; B60W 2510/207; B60W 2520/20; B60W 2520/26; B60W 2520/40; B60W 2530/20; B60W 2710/22; B60W 2720/40
See application file for complete search history.

(56) References Cited

U.S. PATENT DOCUMENTS

2015/0329099 A1* 11/2015 Zawacki ............... B60W 10/18
701/37
2016/0033367 A1* 2/2016 Unterreiner ........... G01L 17/005
73/8
(Continued)

FOREIGN PATENT DOCUMENTS

| EP | 2927074 A1 | 10/2015 |
|---|---|---|
| EP | 3020578 A1 | 5/2016 |

(Continued)

OTHER PUBLICATIONS

European Search Report and Written Opinion in corresponding European Application No. 21180091.7 dated Nov. 9, 2021 (6 pages).

*Primary Examiner* — Truc M Do
(74) *Attorney, Agent, or Firm* — Venable LLP; Jeffri A. Kaminski

(57) ABSTRACT

Method for updating at least one vehicle model parameter and at least one tire parameter in at least one chassis control unit of a vehicle, based on tire sensor information collected by a tire sensor placed on a tire. The method includes the steps of: collecting tire sensor information; updating the at least one vehicle model parameter based on updating at least one tire parameter, updating one tire parameter being based on the tire sensor information.

6 Claims, 3 Drawing Sheets

(51) Int. Cl.
*B60W 10/18* (2012.01)
*B60W 10/22* (2006.01)
*B60W 50/00* (2006.01)
*B60W 50/14* (2020.01)

(52) U.S. Cl.
CPC ............ *B60W 50/00* (2013.01); *B60W 50/14* (2013.01); *B60W 2050/0028* (2013.01); *B60W 2510/207* (2013.01); *B60W 2520/20* (2013.01); *B60W 2520/26* (2013.01); *B60W 2520/40* (2013.01); *B60W 2530/20* (2013.01); *B60W 2710/22* (2013.01); *B60W 2720/40* (2013.01)

(56) References Cited

U.S. PATENT DOCUMENTS

| | | | | |
|---|---|---|---|---|
| 2016/0159367 | A1* | 6/2016 | Singh | B60W 40/10 701/32.9 |
| 2017/0369050 | A1* | 12/2017 | Varnhagen | B60W 10/184 |
| 2019/0152454 | A1 | 5/2019 | Watanabe | |

FOREIGN PATENT DOCUMENTS

| | | | |
|---|---|---|---|
| EP | 3028910 | A1 | 6/2016 |
| WO | 03093081 | A1 | 11/2003 |

* cited by examiner

METHOD AND SYSTEM FOR MODIFYING CHASSIS CONTROL PARAMETERS BASED ON TIRE INFORMATION

TECHNICAL FIELD OF THE INVENTION

This invention relates to the field of controlling chassis subsystems, such as brakes, transmission, suspension, based on tire information.

BACKGROUND

It is known to place sensors inside the tire to collect and provide different real-time information about the tire-road interaction, such as load, tire wear, friction, slip, wheel alignment, steering geometry, hydroplaning, tire health etc. . . . .

But, tire wear information has not yet been used to update and optimize suspension, brakes and powertrain control.

SUMMARY OF THE INVENTION

To that end, the present invention provides a method for updating at least one vehicle model parameter and at least one tire parameter in at least one chassis control unit of a vehicle, based on tire sensor information collected by a tire sensor placed on a tire, the method comprising the steps of:
  collecting tire sensor information;
  updating the at least one vehicle model parameter based on updating at least one tire parameter, updating one tire parameter being based on the tire sensor information
wherein the at least one chassis control unit is the transmission control unit, and wherein tire sensor information is collected by a tire sensor placed on at least two tires belonging to a first axle of the vehicle, and on at least two tires belonging to at least one second axle of the vehicle, and wherein the vehicle model parameter is the desired power distribution on the first and second axle of the vehicle, the step of updating the desired power distribution being based on updating the estimated wear level of the at least two tires belonging to the first axle and of the at least two tires belonging to the second axle, updating the estimated wear level being based on the tire wear information collected on the at least two tires belonging to the first axle and of the at least two tires belonging to the second axle, the step of updating the desired power distribution further comprising the step of:
  determining from the tire wear information at least one determined axle among the first axle and the at least one second axle, the estimated wear level of the tires of the at least one determined axle being smaller, respectively higher, than the estimated wear level of tires belonging to axles among the first axle and the at least one second axle, other than the determined axle;
  increasing, respectively reducing, the desired power sent to the at least one determined axle.

According to an embodiment, the at least one vehicle model parameter is at least one of a desired slip ratio, a desired slip angle, a desired load distribution, a desired power distribution, an understeer allowable band and an oversteer allowable band, and the at least one tire parameter is at least one of an estimated rolling radius, an estimated tire stiffness, and an estimated wear level.

According to an embodiment, the tire sensor information comprises tire wear information and rolling radius information.

According to an embodiment, the at least one chassis control unit is the suspension control unit, and tire sensor information is collected by the tire sensor placed on at least two tires of the vehicle, and the at least one vehicle model parameter is the desired load distribution on the at least two tires, the updating of the desired load distribution being based on updating the estimated wear level of the at least two tires, the updating of the estimated wear level being based on the tire wear information collected on the at least two tires, updating the desired load distribution further comprising the steps of:
  determining from the tire wear information at least one determined tire among the at least two tires, the estimated wear level of the at least one determined tire being smaller, respectively higher, than the estimated wear level of the other tires among the at least two tires;
  increasing, respectively reducing, the desired load on the at least one determined tire among the at least two tires.

According to this provision, the wear distribution of tires evens out.

According to an embodiment, the at least one chassis control unit is the braking control unit, and wherein tire sensor information is collected by a tire sensor placed on at least two tires of the vehicle, and wherein the at least one vehicle model parameter is the desired slip ratio on the at least two tires, the updating of the desired slip ratio being based on updating the estimated wear level of the at least two tires, the updating of the estimated wear level being based on the tire wear information collected on the at least two tires, the updating the desired slip ratio further comprising the step of:
  determining the desired slip ratio on the at least two tires to a value comprised between 20% and 15% based on the tire wear information.

According to an embodiment, the method comprises a step of activating a warning device to warn a driver of the vehicle when it is not possible to further update the load distribution because further updating the load distribution is unsecure.

According to an embodiment, the estimated wear level of the tires belonging to an axle is smaller, respectively higher, than the estimated wear level of other tires if the estimated wear level of at least one tire belonging to said axle is smaller, respectively higher, than the estimated wear level of all other tires of the vehicle.

According to an embodiment, the estimated wear level of the tires belonging to an axle is smaller, respectively higher, than the estimated wear level of other tires, if the estimated wear level of all tires belonging to said axle are smaller, respectively higher, than the estimated wear level of all other tires of the vehicle.

According to an embodiment, the method further comprises a step of activating a warning device to warn a driver of the vehicle when it is not possible to further update the power distribution because further updating the power distribution is unsecure.

According to an embodiment, the at least one chassis control unit is the brake control unit, and wherein tire sensor information is collected by a tire sensor placed on at least two tires belonging to a front axle positioned forward on the vehicle, and on at least two tires belonging to a rear axle positioned backward on the vehicle, and wherein the at least one vehicle model parameter comprises an understeer allowable band and an oversteer allowable band, updating the understeer allowable band and the oversteer allowable band being based on updating the estimated wear level of the at least two tires belonging to the front axle and of the at least two tires belonging to the rear axle, the updating of the estimated wear level being based on the tire wear information collected on the at least two tires belonging to the front axle and of the at least two tires belonging to the rear axle, updating the understeer allowable band and the oversteer allowable band further comprising the step of:

determining whether the estimated wear level of the tires of the front axle is higher, respectively smaller than the estimated wear level of the tires of the rear axle;

adjust the understeer allowable band on the front axle, respectively adjust the oversteer allowable band on the rear axle.

According to these provisions, the vehicle is protected from going to an unstable zone.

According to an embodiment, adjusting understeer allowable band, or the oversteer allowable band comprises increasing or decreasing, based on the tire wear, the understeer allowable band.

According to an embodiment, the method further comprises a step of activating a warning device to warn a driver of the vehicle when it is not possible to further update the understeer allowable band and the oversteer allowable band because further updating the understeer allowable band and the oversteer allowable band is unsecure.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which the same reference refer to similar elements or to elements having similar functions, and in which.

DETAILED DESCRIPTION OF THE INVENTION ACCORDING TO AN EMBODIMENT

The invention concerns a method 100 for updating at least one tire parameter TP in at least one chassis control unit BCU, TCU, SCU of a vehicle, based on tire wear TW information collected by a tire wear sensor TWS placed on a tire T.

The at least one chassis control unit is a braking control unit BCU, or a transmission control unit TCU or a suspension control unit SCU.

At periodic intervals, the chassis control unit receives tire wear information TWI collected by a tire wear sensor TWS placed on a tire of the vehicle. Preferably, all tires of the vehicle are provided with a tire wear sensor TWS, and the chassis control unit periodically receives tire wear information TWI collected by the tire wear sensor TWS of each tire of the vehicle.

At each period, the vehicle dynamics is evaluated by said chassis control unit based on a vehicle model run by the chassis control unit. The vehicle model is provided with vehicle model parameters VMP, such as a desired slip ratio SR for traction and braking, a desired slip angle SA for stability, and a desired load distribution LD for ride comfort and suspension. The vehicle model parameters VMP are estimated using vehicle information combined with tire parameters TP such as estimated rolling radius RR, estimated wear level WL, estimated tire stiffness TS; etc. The vehicle model is configured to evaluate that the vehicle model parameters VMP are modified in such a way that the dynamics of the vehicle are not affected to reduce the safety on the vehicle.

A tire model is a sub model inside the vehicle model which the chassis control unit runs.

When the tire wear is uneven, the vehicle is losing on traction since all the tires have different tire wear, all the more so if the tires are on driven wheels.

Figure 4:
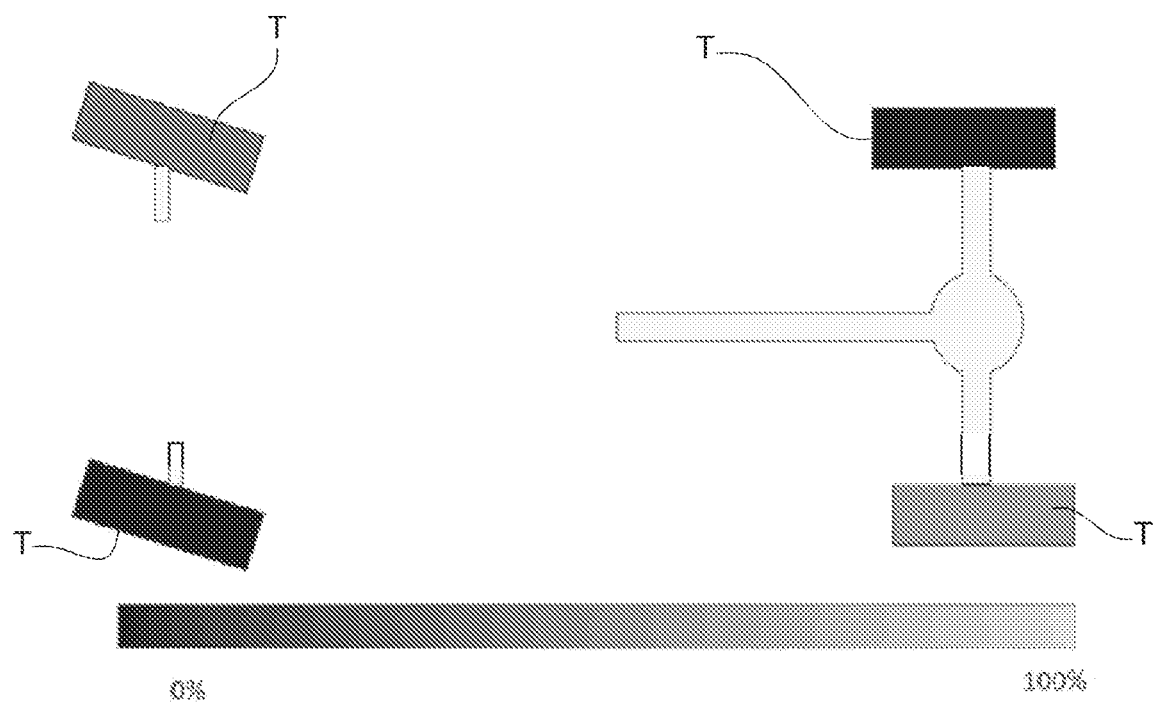
FIG. 4 is a schematic representation of a vehicle with four tires and one axle drive.

FIG. 4 is a schematic representation of a vehicle with 4 tires, the two front wheels being represented on the left side of the drawing, and the two rear wheels being represented on the right side of the drawing. The two rear wheels are drive wheels, and the two front wheels are direction wheels. Tire wear information TWI of each tire is represented by an intensity of gray, white tire representing a 100% worn tire, and a black tire representing a 0% worn tire, a gray tire representing a tire x % worn, where x is comprised between 0 and 100.

Figure 5:
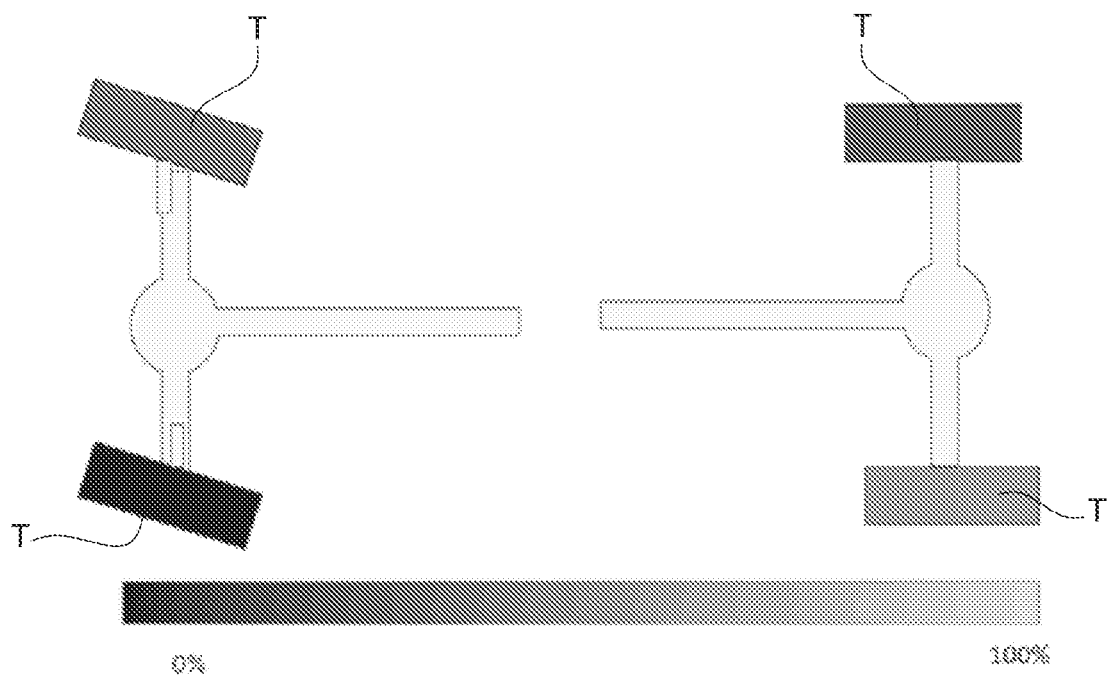
FIG. 5 is a schematic representation of a vehicle with four tires and two axle drive.

FIG. 5 is a similar representation of a 4 wheel drive vehicle.

Figure 1:
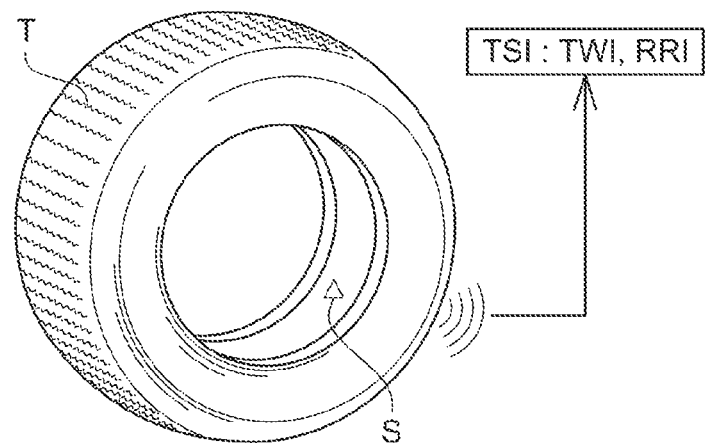
FIG. 1 represents a tire provided with a sensor configured to measure tire wear
Figure 2:
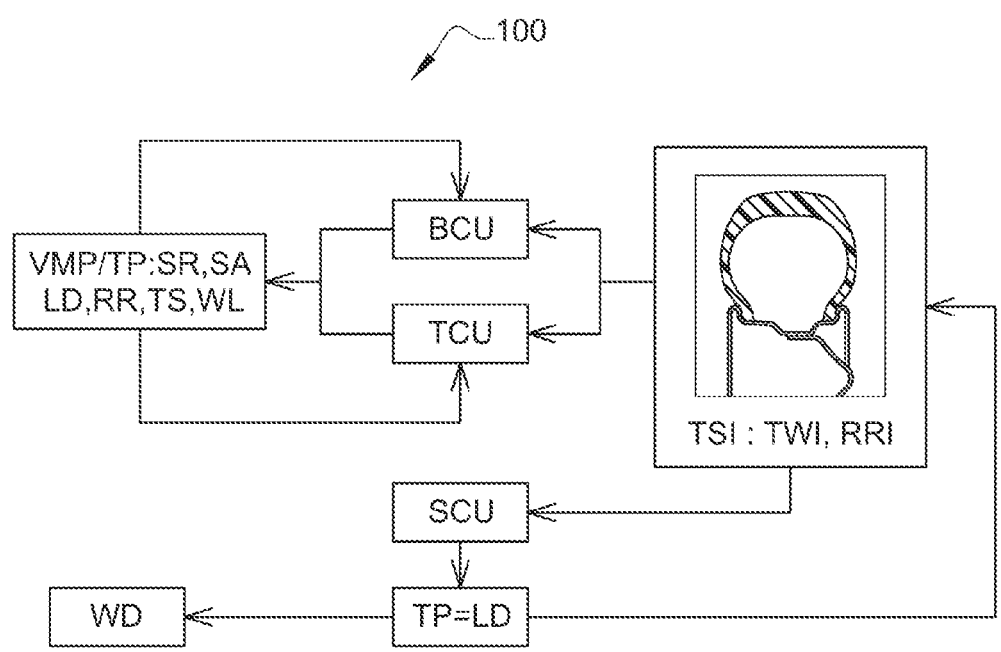
FIG. 2 is a schematic representation of the general architecture of the method according to an embodiment of the invention.
Figure 3:
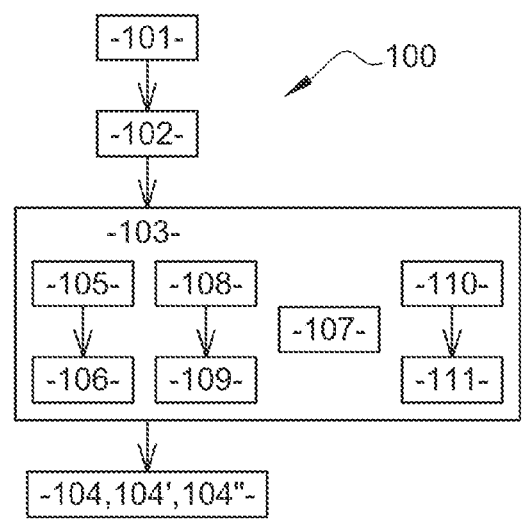
FIG. 3 is a schematic representation of the steps of the method according to an embodiment of the invention.

As an example, the tire wear information TWI represented in FIGS. 3 and 4, illustrates a situation wherein the 4 tires are unevenly worn.

The method 100 according to the invention will be described herein in reference to a vehicle comprising 4 tires, but the man skilled in the art will understand that the invention may as well be applied to a vehicle with any other number of tires, for example 6 or 8 or more tires.

Thus, as indicated above, one vehicle model parameter VMP among a desired slip ratio SR for traction and braking, and/or a desired slip angle SA for stability, and/or a desired load distribution LD for ride comfort and suspension, is updated in the chassis control unit BCU, TCU, SCU of the vehicle, based on at least one tire parameter TP which is itself updated based on tire sensor information TSI, such as tire wear information TWI, rolling radius information RRI, etc. . . . , collected by the tire sensor S placed on each tire T.

For example, if the rear driven tire is worn out more than the other tires, the desired slip ratio SR and the desired load distribution LD will be updated so that the desired slip ratio is reduced and the desired load is increased on the other tires in such a way that other tires will wear more and come progressively to a level of wear equal to the rear driven tire.

As shown in FIG. 4, the front left tire and right rear tire are new tires, therefore the method 100 according to the invention would increase the load to an acceptable percentage from the rear left tire and front right tire which are worn out. The acceptable percentage limit is decided by the vehicle dynamics, based on the vehicle model. As long as the dynamics is not drastically changed and is within safe operating conditions, the load would be changed. This will exert more pressure on the new tires relative to the worn ones and eventually even out the tire wear on all 4 wheel ends.

However, the method 100 is configured to optimize also traction; in other words, method 100 is configured to determine which axle at which tire wear level would provide best traction for fuel economy or stopping distance and to keep optimizing fuel economy or stopping distance. Since traction depends on both tire wear and normal load, the method 100 is configured to determine the best traction and eventually also to decide wearing out which axles will keep traction higher for longer period of time. As an example, if the rear most axle is usually less loaded, then the method 100 will not get traction on that tire. Similarly, if the rear most is worn out a lot, the method 100 will not get traction on that tire. Therefore, the method 100 will transfer the load to the front tire. If one tire is worn out more and is heavily loaded, then the method will do a mathematical extrapolation to decide how to transfer the load.

The method 100 is furthermore configured to determine that the load distribution remains within safety limits. Moreover, the method 100 comprises a step of activating a warning device WD to warn a driver of the vehicle when it is not possible to further update the load distribution LD because further updating the load distribution LD is unsecure.

The below sections describes how power is modified to even out the wear distribution of tires.

Considering a case where the tires of the front axle is less worn than the tires of rear axle, if the load distribution permits, the power sent to front axle will be increased by a percentage increase and the power sent to rear axle will be reduced by a percentage reduction, the percentage increase and the percentage reduction being determined according to multiple factors, such as load distribution and speed, and tire wear; for example the method 100 may decide to increase from 30% to 34% the power sent to front axle while the power sent to rear axle is reduced from 70% to 66% to even out the tire wear.

Similarly desired load distribution is modified for modifying power to the axles to even out the wear in a 6×4 pusher or tag or in a 6×4 both rear driven axles.

Similarly, the power distribution is optimized in transmission control unit TCU to get the best traction out and even out the tire wear for future.

Figure 6:
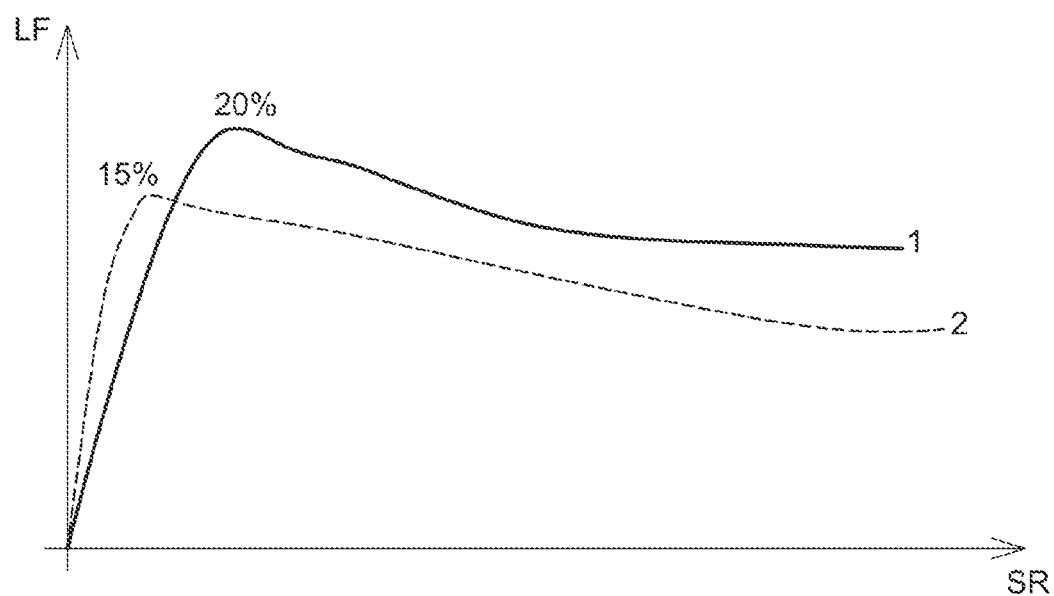
FIG. 6 is a graphical representation of the evolution of the longitudinal force the y-axis with respect to the slip ratio on the x-axis.

This desired slip ratio parameter will be updated based on the tire wear to utilize the peak force to reduce stopping distance. For example, as illustrated on FIG. 6, for the new tire the evolution of the longitudinal force LF with respect to the slip ratio SR is represented on the curve 1, and for the worn out tire the evolution of the longitudinal force LF with respect to the slip ratio SR is represented on the curve 2; the desired slip ratio where the peak force is achieved is changed from 20% for the new tire to 15% for the worn out tire. Traction control also has a desired slip ratio curve, which is typically the same.

In Electronic Stability Program (ESP), other vehicle model parameter VMP are also considered, such as understeer allowable band and oversteer allowable band. Usually vehicles with lower rear grip will start to over steer and lower front grip will start to understeer. Depending on which axle is worn out more, the method 100 is configured to adjust the band to protect the vehicle from going to the unstable zone. If the front axle is worn out more, the method 100 increases the intervention band for understeer, since the vehicle might understeer much early. Similarly, if the rear axle is worn out more. The over steer band is optimized to interfere oversteer interventions much earlier to keep the truck safe.

All the above examples are for specific cases like load distribution or power distribution or other parameters optimization. The method 100 is configured to optimize them, based on a vehicle model considering both load distribution, power distribution, and other parameters tuning in one box like a permutation and combination of examples.

The method according to an embodiment of the invention will now be described more specifically in reference to FIG. 3.

The method 100 comprises the steps of:
collecting 101 tire sensor information TSI;
updating 103 the at least one vehicle model parameter VMP based on updating 102 at least one tire parameter TP, updating 102 one tire parameter TP being based on tire sensor information TSI collected by the sensor S placed on the tire T.

In particular, the at least one vehicle model parameter VMP may be at least one of a desired slip ratio SR, a desired slip angle SA, a desired load distribution LD, a desired power distribution PD, an understeer allowable band and an oversteer allowable band, and the at least one tire parameter TP may be at least one of an estimated rolling radius RR, an estimated tire stiffness TS, and an estimated wear level WL.

More particularly, the tire sensor information TSI maybe tire wear information TWI and rolling radius information RRI.

More specifically, the at least one chassis control unit may be the suspension control unit SCU, and the tire sensor information TSI is collected by the tire sensor S placed on at least two tires T of the vehicle; the at least one vehicle model parameter VMP is the desired load distribution LD on the at least two tires T, the updating 103 of the desired load distribution LD being based on updating 102 the estimated wear level WL of the at least two tires T; the updating 102 of the estimated wear level WL is itself based on the tire wear information TWI collected 101 on the at least two tires T; and updating 103 the desired load distribution LD further comprises the steps of:
determining 105, from the tire wear TWI information, at least one determined tire among the at least two tires T, the estimated wear level WL of the at least one determined tire being smaller, respectively higher, than the estimated wear level WL of the other tires among the at least two tires T;
increasing, respectively reducing, 106 the desired load LD on the at least one determined tire T among the at least two tires T.

According to these provisions, the wear distribution of tires evens out.

More particularly, the method 100 further comprises a step of activating 104 a warning device WD to warn a driver of the vehicle when it is not possible to further update the load distribution LD because further updating the load distribution LD is unsecure.

According to another example embodiment of the method, the at least one chassis control unit is the transmission control unit TCU, and the tire sensor information TSI is collected by a tire sensor S placed on at least two tires T belonging to a first axle of the vehicle, and on at least two tires T belonging to at least one second axle of the vehicle; the vehicle model parameter VMP is the desired power distribution PD on the first and second axle of the vehicle; the step of updating 103 the desired power distribution PD is based on updating 102 the estimated wear level WL of the at least two tires T belonging to the first axle and of the at least two tires T belonging to the second axle; updating 102 the estimated wear level WL is itself based on the tire wear information TWI collected 101 on the at least two tires T belonging to the first axle and of the at least two tires T belonging to the second axle; and the step of updating 103 the desired power distribution PD further comprises the step of:

determining 108 from the tire wear information TWI at least one determined axle among the first axle and the at least one second axle, where the estimated wear level WL of the tires T of the at least one determined axle is smaller, respectively higher, than the estimated wear level WL of tires T belonging to axles among the first axle and the at least one second axle, other than the determined axle;

increasing, respectively reducing, 109 the desired power PD sent to the at least one determined axle.

As an example, the estimated wear level WL of the tires T belonging to an axle is smaller, respectively higher, than the estimated wear level WL of other tires T if the estimated wear level WL of at least one tire T belonging to said axle is smaller, respectively higher, than the estimated wear level WL of all other tires of the vehicle.

As another example, the estimated wear level WL of the tires T belonging to an axle is smaller, respectively higher, than the estimated wear level WL of other tires T, if the estimated wear level WL of all tires T belonging to said axle are smaller, respectively higher, than the estimated wear level WL of all other tires of the vehicle.

According to an embodiment, the method further comprises a step of activating 104' a warning device WD to warn a driver of the vehicle when it is not possible to further update the power distribution PD because further updating the power distribution PD is unsecure.

According to a further example embodiment of the method, the at least one chassis control unit is the brake control unit BCU, and wherein tire sensor information TSI is collected by a tire sensor S placed on at least two tires T belonging to a front axle positioned forward on the vehicle, and on at least two tires belonging to a rear axle positioned backward on the vehicle; the at least one vehicle model parameter VMP comprises an understeer allowable band and an oversteer allowable band, so that updating 103 the understeer allowable band and the oversteer allowable band is based on updating 102 the estimated wear level WL of the at least two tires T belonging to the front axle and of the at least two tires T belonging to the rear axle; the updating 102 of the estimated wear level WL is itself based on the tire wear information TWI collected 101 on the at least two tires T belonging to the front axle and of the at least two tires T belonging to the rear axle; updating 103 the understeer allowable band and the oversteer allowable band further comprises the step of:

determining 110 whether the estimated wear level WL of the tires of the front axle is higher, respectively smaller than the estimated wear level WL of the tires of the rear axle;

adjusting 111 the understeer allowable band on the front axle, respectively adjusting the oversteer allowable band on the rear axle.

According to these provisions, the vehicle is protected from going to an unstable zone.

As an example, adjusting understeer allowable band, or the oversteer allowable band comprises increasing the understeer allowable band, respectively increasing the understeer allowable band.

According to an embodiment, the method further comprises a step of activating 104" a warning device WD to warn a driver of the vehicle when it is not possible to further update the understeer allowable band and the oversteer allowable band because further updating the understeer allowable band and the oversteer allowable band is unsecure.

The invention claimed is:

1. Method for updating at least two vehicle model parameters and at least one tire parameter in at least two chassis control units of a vehicle, based on tire sensor information collected by a tire sensor placed on a tire, the method comprising the steps of:

collecting tire sensor information, wherein the tire sensor information comprises tire wear information;

updating the at least two vehicle model parameters based on updating at least one tire parameter, updating one tire parameter being based on the tire sensor information, wherein one of the at least two chassis control units is a transmission control unit, and wherein tire sensor information is collected by a tire sensor placed on at least two tires belonging to a first axle of the vehicle, and on at least two tires belonging to at least one second axle of the vehicle, and wherein one of the vehicle model parameters is a desired power distribution on the first and second axle of the vehicle, the step of updating the desired power distribution being based on updating an estimated wear level (WL) of the at least two tires belonging to the first axle and of the at least two tires belonging to the second axle, updating the estimated wear level being based on the tire wear information collected on the at least two tires belonging to the first axle and of the at least two tires belonging to the second axle, the step of updating the desired power distribution further comprising the steps of:

determining from the tire wear information at least one determined axle among the first axle and the at least one second axle, an estimated wear level of the tires of the at least one determined axle being smaller, respectively higher, than the estimated wear level of tires belonging to axles among the first axle and the at least one second axle, other than the determined axle; and increasing, respectively reducing, the desired power sent to the at least one determined axle, further wherein one of the at least two chassis control units is a suspension control unit, and wherein one of the at least two vehicle model parameters is a desired load distribution on the at least two tires of the first axle or of the second axle, the updating of the desired load distribution being based on updating the estimated wear level of the at least two tires of the first axle or of the second axle, the updating of the estimated wear level being based on the tire wear information collected on the at least two tires of the first axle or of the second axle, updating the desired load distribution further comprising the steps of:

determining from the tire wear information at least one determined tire among the at least two tires of the first axle or of the second axle, the estimated wear level of the at least one determined tire being smaller, respectively higher, than the estimated wear level of the other tires among the at least two tires; and increasing, respectively reducing, the desired load on the at least one determined tire among the at least two tires of the first axle or of the second axle.

2. Method according to claim 1, wherein the at least two vehicle model parameters further comprise at least one of a desired slip ratio, a desired slip angle, an understeer allowable band and an oversteer allowable band, and wherein the at least one tire parameter further comprises at least one of an estimated rolling radius, and an estimated tire stiffness.

3. Method according to claim 1, wherein the tire sensor information comprises rolling radius information.

4. Method according to claim 3, wherein one of the at least two vehicle model parameters is the desired slip ratio on the at least two tires of the first axle or of the second axle, the updating of the desired slip ratio being based on updating the estimated wear level of the at least two tires of the first axle or of the second axle, the updating of the estimated wear level being based on the tire wear information collected on the at least two tires of the first axle or of the second axle, the updating the desired slip ratio further comprising the step of:
    determining the desired slip ratio on the at least two tires of the first axle or of the second axle to a value comprised between 20% and 15% based on the tire wear information.

5. Method according to claim 1, further comprising a step of activating a warning device to warn a driver of the vehicle when it is not possible to further update the load distribution because further updating the load distribution is unsecure.

6. Method according to claim 1, wherein one of the at least two chassis control units is a brake control unit, and wherein tire sensor information is collected by a tire sensor placed on at least two tires belonging to a front axle positioned forward on the vehicle, and on at least two tires belonging to a rear axle positioned backward on the vehicle, and wherein one of the at least two vehicle model parameters comprises an understeer allowable band and an oversteer allowable band, updating the understeer allowable band and the oversteer allowable band being based on updating the estimated wear level of the at least two tires belonging to the front axle and of the at least two tires belonging to the rear axle, the updating of the estimated wear level being based on the tire wear information collected on the at least two tires belonging to the front axle and of the at least two tires belonging to the rear axle, updating the understeer allowable band and the oversteer allowable band further comprising the steps of:
    determining whether the estimated wear level of the tires of the front axle is higher, respectively smaller than the estimated wear level of the tires of the rear axle; and
    adjust the understeer allowable band on the front axle, respectively adjust the oversteer allowable band on the rear axle.

\* \* \* \* \*